United States Patent [19]

Tomkin

[11] Patent Number: 4,679,276
[45] Date of Patent: Jul. 14, 1987

[54] RETAINING MEANS

[76] Inventor: Frederick J. Tomkin, 4 Queensway, London W2, England

[21] Appl. No.: 760,311

[22] Filed: Jul. 29, 1985

[51] Int. Cl.4 .............................. B60S 1/38; B60S 1/02
[52] U.S. Cl. ................................ 15/250.42; 15/250.36
[58] Field of Search ......................... 15/250.36–250.42

[56] References Cited

U.S. PATENT DOCUMENTS

| | | |
|---|---|---|
| 3,820,188 | 6/1974 | Moorhead et al. ............... 15/250.42 |
| 3,903,560 | 9/1975 | Jewell et al. ..................... 15/250.42 |
| 4,360,943 | 11/1982 | Thompson et al. .............. 15/250.42 |
| 4,388,742 | 6/1983 | Kimber et al. ................... 15/250.42 |
| 4,389,747 | 6/1983 | Riester ............................. 15/250.42 |
| 4,501,043 | 2/1985 | Plisky .............................. 15/250.42 |
| 4,566,147 | 1/1986 | Baerenwald et al. ............ 15/250.42 |

*Primary Examiner*—Peter Feldman
*Attorney, Agent, or Firm*—Parmelee, Bollinger & Bramblett

[57] ABSTRACT

A releasable retaining means for restraining a squeegee element against longitudinal movement relative to a flexible resilient squeegee element backing strip and for limiting longitudinal movement of the backing strip relative to a harness of a windscreen wiper blade assembly, the retaining means comprising a clip having a body portion and at least one leg resiliently connected thereto, wherein the or each leg and the body portion together with the backing strip form a receiving means for engaging a claw of the harness, whereby to limit longitudinal movement of the backing strip relative to the harness, and, wherein the body portion includes an anchoring means adapted to penetrate into the backing strip and compress a portion of the squeegee element into frictional engagement with the backing strip, whereby to restrain the squeegee element against longitudinal movement relative the backing strip.

11 Claims, 13 Drawing Figures

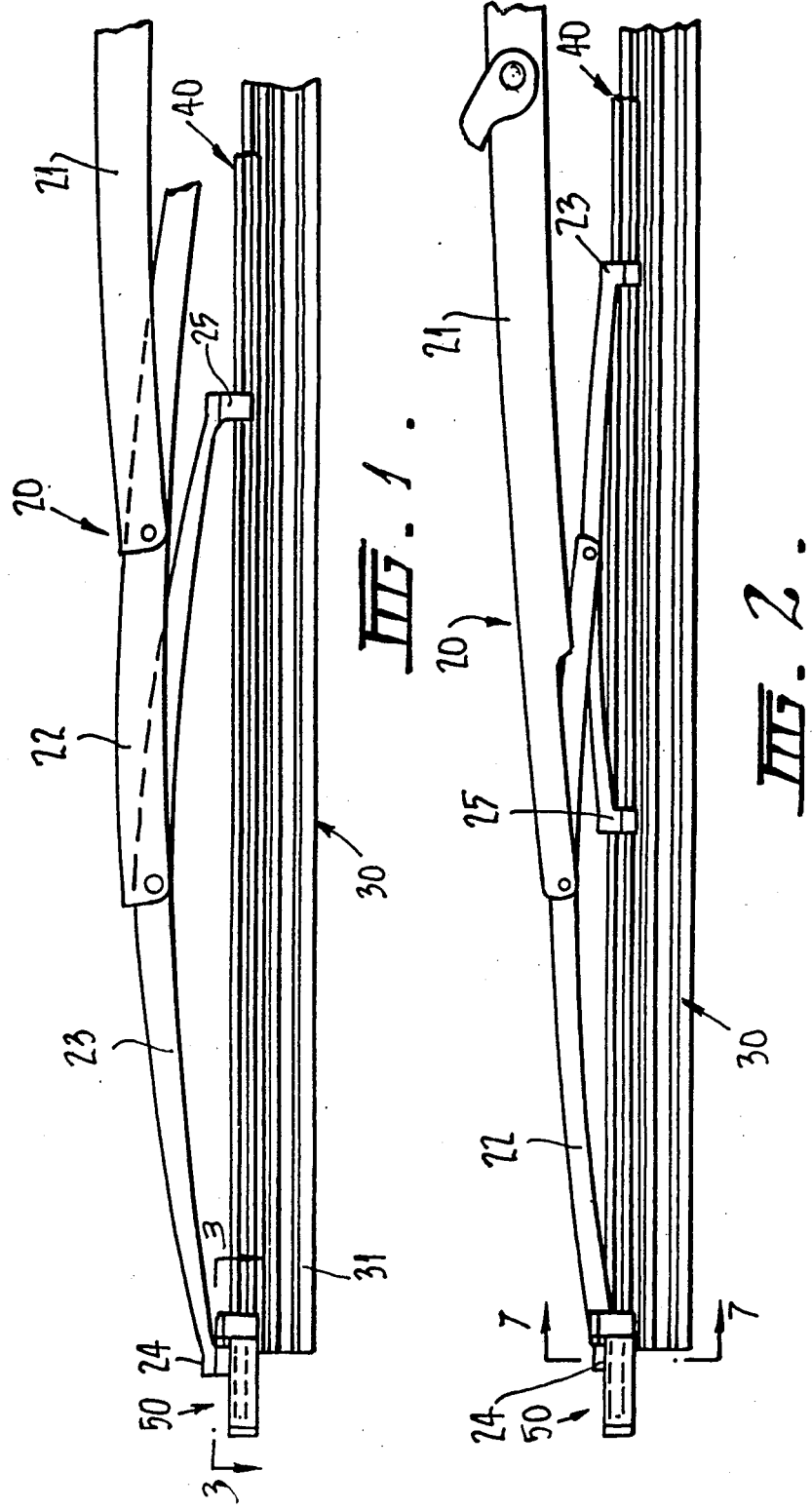

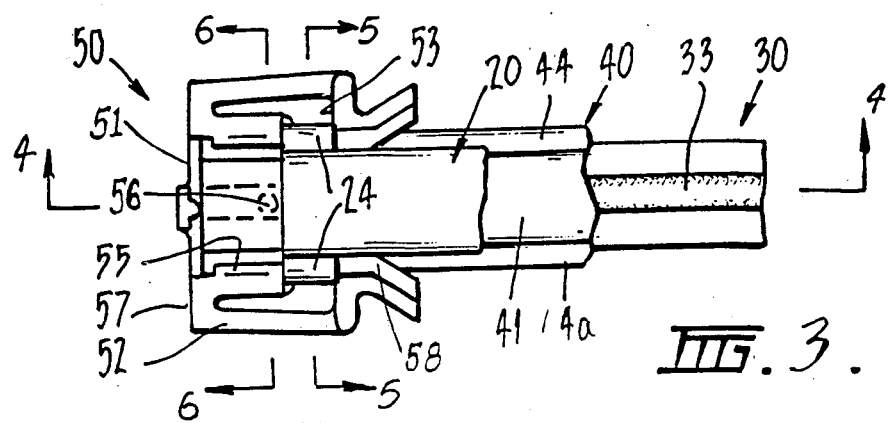
FIG. 3.
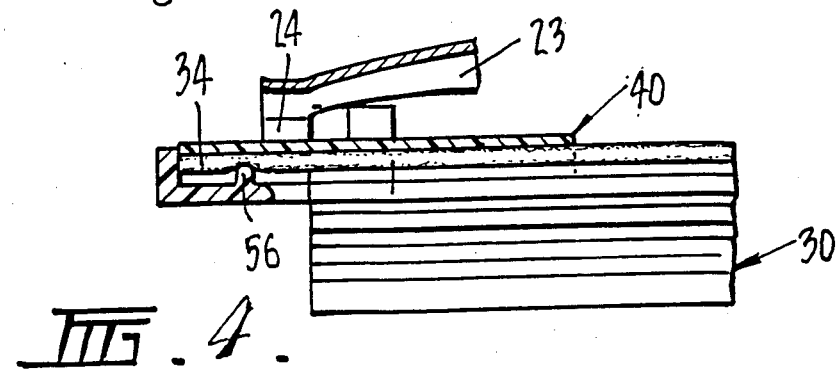
FIG. 4.
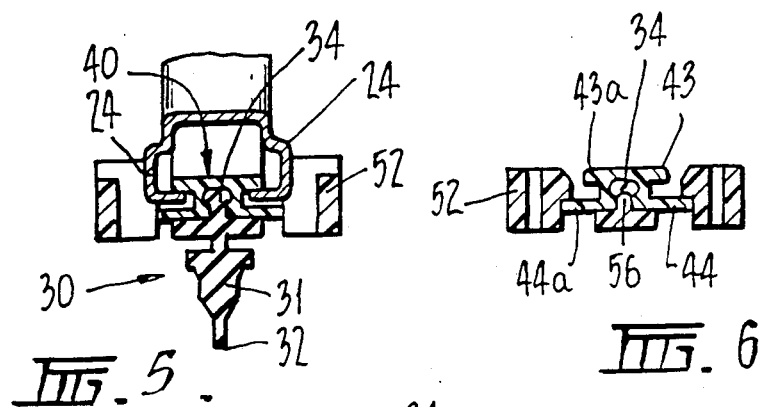
FIG. 5.
FIG. 6.
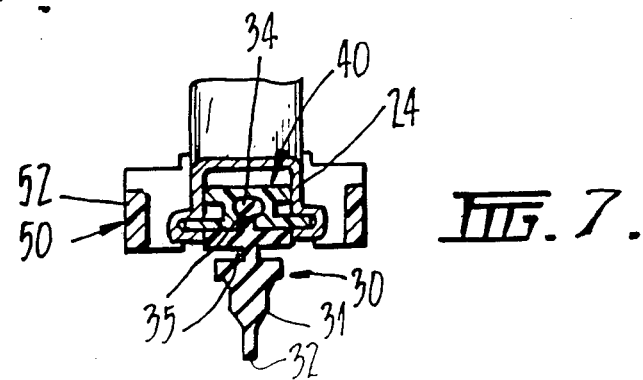
FIG. 7.

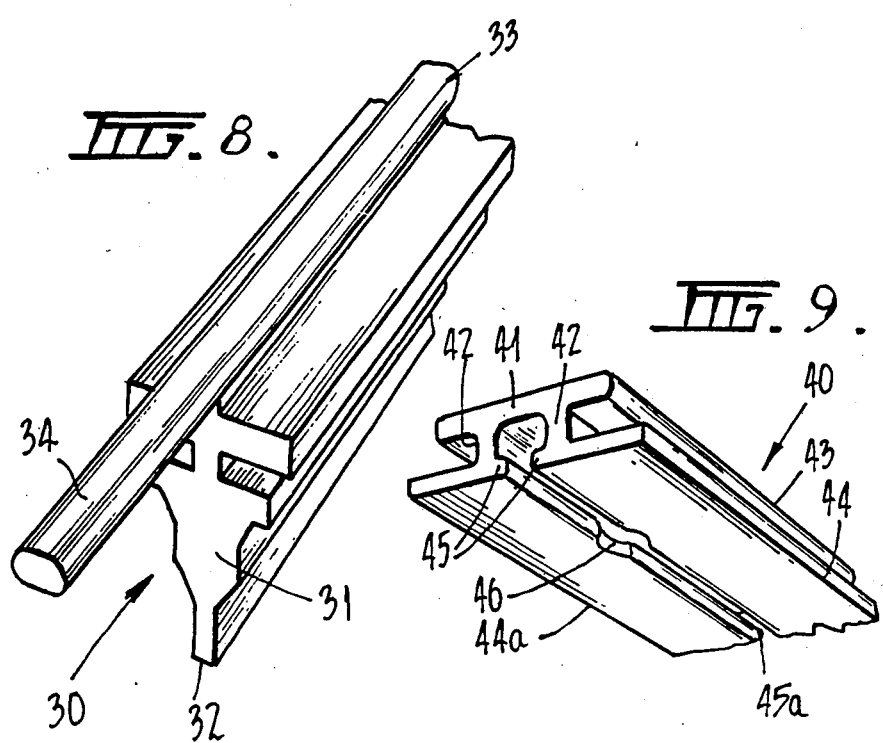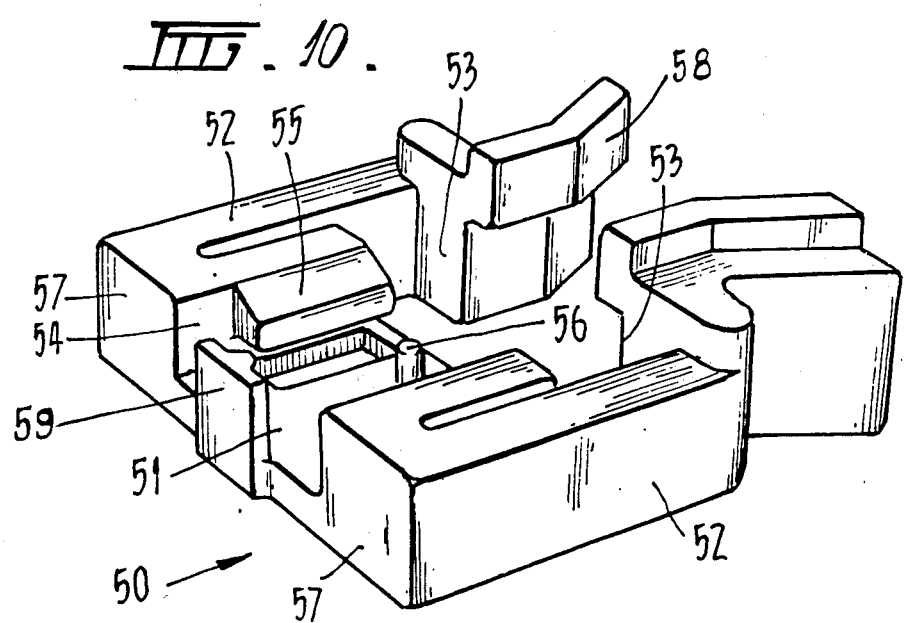

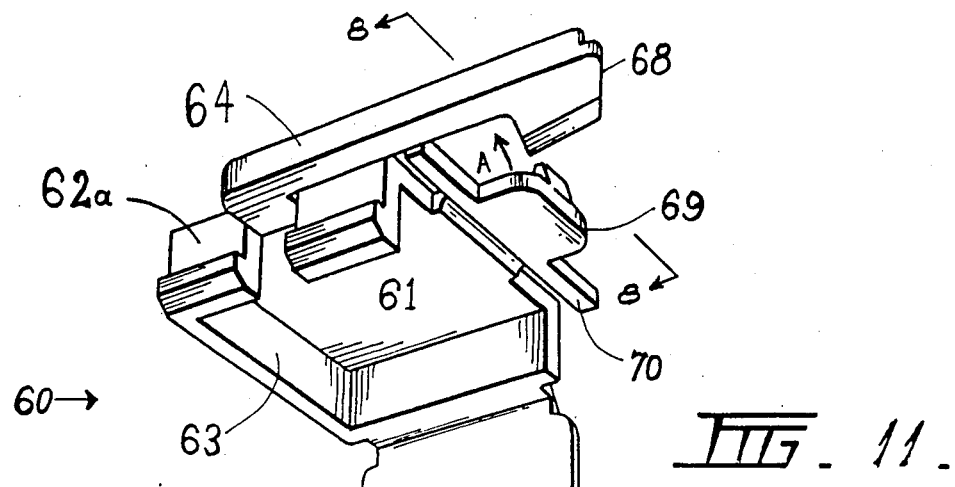
FIG. 11.
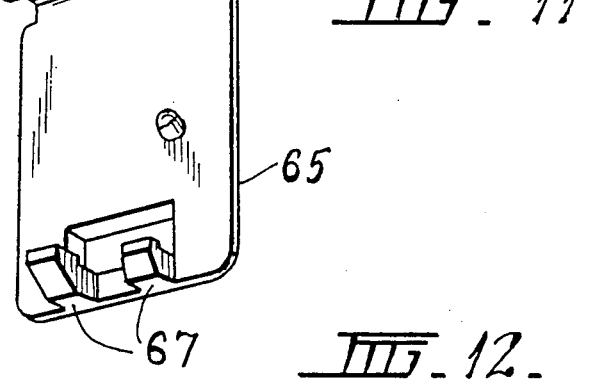
FIG. 12.
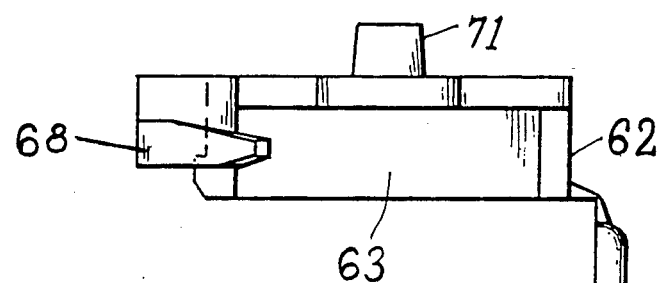
FIG. 13.
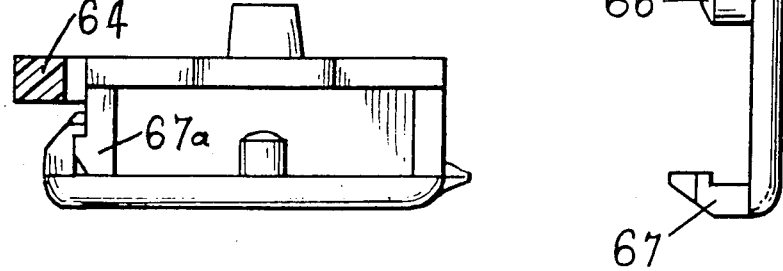

RETAINING MEANS

This invention relates to an improved retaining means for retaining a replaceable refill unit in a windscreen wiper blade assembly. The invention also relates to an improved refill unit for use in the wiper blade assembly.

Conventional windscreen wiper blade assemblies, in particular those as used on light and commercial motor vehicles i.e. cars and transport trucks, are generally of the type where the flexible pressure distributing harness is of a fixed construction and which slideably retains a replaceable refill unit specifically designed to be accommodated in the particular flexible pressure distributing harness which it is adapted to fit. Unfortunately, the length and particulars of construction of the flexible pressure distributing harness are not uniform, such that replaceable refill units designed for use in the harness of one manufacturer are unusable in the harness of another manufacturer unless that harness is modified. Accordingly, it has hitherto been necessary for Vehicle-Parts stockists to carry the complete range of harnesses and complimentary replaceable refill units and accept the associated stock and storage expenses for carrying the entire range or, for the sake of economy confine the stock to that one windscreen wiper blade assembly they believe to be the most commonly used.

It is an object of the present invention to provide a retaining means for use with a replaceable refill unit, which can be used in diverse windscreen wiper blade assemblies, without the need for modifying the assemblies.

SUMMARY OF THE INVENTION

According to the invention, there is provided a releasable retaining means for restraining a squeege element against longitudinal movement relative to a flexible resilient squeegee element backing strip and for limiting longitudinal movement of the backing strip relative to a harness of a windscreen wiper blade assembly, the retaining means comprising a clip having a body portion and at least one leg resiliently connected thereto, wherein the or each leg and the body portion together with the backing strip form a receiving means for engaging a claw of the harness, whereby to limit longitudinal movement of the backing strip relative to the harness, and, wherein the body portion includes an anchoring means adapted to penetrate into the backing strip and compress a portion of the squeegee element into frictional engagement with the backing strip, whereby to restrain the squeegee element against longitudinal movement relative to the backing strip. The retaining means is therefore adapted to retain the wiping squeegee element in engagement with the wiping squeegee element backing strip, thereby forming a replaceable refill unit.

Therefore, in a further aspect of the invention, there is provided a replaceable refill unit for use in a windscreen wiper blade assembly for motor vehicles including a flexible pressure distributing harness having a plurality of pairs of laterally spaced apart opposed blade straddling claws, the refill unit comprising a flexible resilient squeegee element of elastomeric material having a guide bead integral an anchoring bead along one edge thereof, and, a wiping lip along the opposite edge thereof; and a flexible resilient backing strip for supporting the squeegee element, which backing strip comprises an elongate channel member having a pair of flexible resilient legs connected together by a web, a first pair and a second pair of co-planar elongate side rails disposed for slidable engagement in the pairs of opposed blade straddling claws, each side rail of the first pair of side rails extending longitudinally along and laterally outwardly of the web, and, each side rail of the second pair of side wails extending longitudinally along and laterally outwardly of the leg of the channel member, the distance between the outer longitudinal edges of the first pair of side rails being different from the distance between the outer longitudinal edges of the second pair of side rails, whereby the backing strip is adapted to accommodate different wiper blade harnesses having opposed pairs of straddling claws spaced apart different distances, and wherein the guide bead and anchoring bead of the squeegee element being receiveable in the channel member. The retaining means also preferably assists in securing the replaceable refill unit to the flexible pressure distributing harness of a windscreen wiper blade assembly.

DESCRIPTION OF THE PREFERRED EMBODIMENTS OF THE INVENTION

In a preferred construction, the retaining means is a clip and preferably of a flexible resilient nature. The web of the body portion may be of any suitable geometric shape such as square or oval, but preferably it is substantially rectangular. The length of the or each leg may be greater than, equal to or less than the length of the web. It is preferred that the or each leg is longer than the body portion and that the resilient clip has a substantially L or U-shaped configuration with the leg(s) extending directly or indirectly from one side wall or both opposed side walls of the body portion. In the most preferred form, the clip is substantially U-shaped.

Preferably the or each leg of the clip is flexibly and resiliently connected to the web, such that the or each leg is adapted to resiliently engage the claws of the harness.

The body portion is also provided with an anchoring means, preferably in the form of a tongue, which is adapted to engage and secure the squeegee element within the backing strip when located therein. The tongue is preferably a pin and in one form is preferably located substantially mid-way the length and substantially near the inner peripheral longitudinal edge of the web of the body portion.

The body portion may also be provided with an end wall which may function as a stop and/or reinforcing member. In one form, the end wall may extend continuously between the opposed side walls and along the outer longitudinal edge of the body portion. The end wall may also protrude beyond the outer peripheral corners of the body portion and thereby beyond the opposed side wall and provide a means for securing one end of the or each of the legs to the body portion. The end wall where it functions as a stop member while being integral with the web of the body portion is spaced apart the opposed side wall. In this way, the end wall can function to assist the anchoring means in securing the squeegee element from longitudinal movement or displacement relative to the backing strip, when located therein.

The opposed side walls and the end wall are adapted to assist the anchoring means in holding the squeegee element in frictional or clamping engageemnt with the backing strip.

In another form, one of the side walls of the body portion has a flap member hingedly connected thereto which is adapted to co-operate with the other side wall such that the body portion will substantially completely overlie a portion of the backing strip when located therein. In this form, it is preferred that the flap member has the anchoring means located thereon to assist the anchoring means in holding the squeegee element into frictional engagement with the backing strip.

Where the clip comprises a pair of flexible legs, it is preferred that the free ends of the legs are sufficiently spaced apart from the inner longitudinal peripheral edge of the web so that the straddling claw or claws of the flexible pressure distributing harness will be encaptured or partially encaptured within the confines of the clip. It is further preferred that the spacing of the free ends of the legs be sufficient to enable easy manipulation of the clip on the flexible pressure distributing harness to enable the clip to pass over and locate behind the straddling claws. It is further preferred that each of the free ends of the legs be provided with a shoulder region adapted to lock behind the appropriate straddling claws, to restrain the clip from disengaging the or part of the straddling claw when the clip has been located thereover. The flexible resilient squeegee element of the replaceable refill unit preferably comprises a body portion, a head portion and a neck portion located therebetween.

The body portion is preferably of a substantially triangular configuration in cross section, with a working edge forming the apex of the triangle wherein the working edge is the wiping lip of the squeegee element.

The head portion of the squeegee element may be of any suitable geometric shape in cross section, such as circular, rectangular, oval or square provided it is receiveable within the backing strip and provides the means for co-operating with the backing strip to yield the replaceable refill unit. The head portion comprises a guide bead integral an anchoring bead which is located on the opposite edge to the wiping lip of the squeegee element.

The neck portion of the squeegee element is preferably integral the head and body portion and may also be of any suitable geometric shape which provides a hinging zone between the body and head portions to allow the body portion to hinge about and relative to the head portion when the head portion is anchored in the backing strip. The cross section of the neck portion need not be constant throughout that section, but it is preferred that the cross section is constant and that the neck portion is of a triangular configuration in cross section. The guide bead and anchoring bead can be of different configuration provided the guide bead can be held into frictional or clamping engagement within the backing strip. The guide bead may also provide the means for threading the squeegee element into the backing strip.

The backing strip of the replaceable refill unit is preferably constructed of a flexible resilient material which can be extruded or moulded from such a material.

The backing strip is adapted to receive the guide bead and anchoring bead of the squeegee element and is preferably of a substantially U-shaped configuration comprising a pair of opposed legs connected together by a web.

It is preferred that the outer longitudinal edges of the second pair of side rails which extend longitudinally along and laterally outwardly of the legs of the backing strip are spaced further apart than the outer longitudinal edges of the first pair of side rails which extend longitudinally along and laterally outwardly of the web. As a result thereof, it is possible that the backing strip is adapted to be accommodated by two different flexible pressure distributing harnesses having straddling claws which are spaced at different distances apart.

Example embodiments of the present invention are illustrated in the accompanying drawings, in which:

FIG. 1 is a side view of the invention incorporated in one form of a windscreen wiper blade assembly;

FIG. 2 is a side view of the invention incorporated in another form of a windscreen wiper blade assembly;

FIG. 3 is a plan view taken along line 3—3 of FIG. 1;

FIG. 4 is a sectional view taken along line 4—4 of FIG. 3;

FIG. 5 is a sectional view taken along line 5—5 of FIG. 3;

FIG. 6 is a sectional view along line 6—6 of FIG. 3;

FIG. 7 is a sectional view taken along line 7—7 of FIG. 2;

FIG. 8 is a perspective view of the squeegee element of the replaceable refill unit;

FIG. 9 is a perspective view of the backing strip of the replaceable refill unit;

FIG. 10 is a perspective view of the retaining means of the invention.

FIG. 11 is a perspective view of another form of the retaining means of the invention in its open condition.

FIG. 12 is a front view of the retaining means of FIG. 11; and,

FIG. 13 is a sectional view taken along line 8—8 of FIG. 11 wherein the retaining means is in its closed condition.

In the FIGS. there is shown a flexible pressure distributing harness (in part) 20 of a wiper arm and blade assembly (not shown) the harnesses of FIG. 1 and 2 are an illustration of two different type of harnesses currently available. Each of the harnesses 20 include a primary lever 21 and secondary lever 22 which secondary lever 22 is in pivotal relationship to lever 21. A further lever 23 is connected to secondary lever 22 and pivoted at its center thereof. The levers 22 and 23 have pairs of opposed blade straddling claws 24 and 25 respective, formed at their outer ends. The claws are substantially U-shaped in cross section.

A squeegee element 30 is slideably received in a backing strip 40 which backing strip is retained between the pairs of opposed claws 24 and 25.

The squeegee element 30 comprises a body portion 31 of substantially triangular configuration in cross section having a wiping lip 32 at the apex thereof. The squeegee element 30 is also provided with an anchoring bead 33 which is of substantially oval configuration and is integral the body portion 31 via neck portion 35. The neck portion 35 as illustrated is of a substantially cruciform configuration but may also equally be of a triangular form. The length of the body portion 31 and anchoring bead 33 is substantially the same. As will be seen from FIG. 8, the anchoring bead 33 is of a greater length than the body and neck portions 31 and 35 respective and provides a guide bead 34 which is adapted to prevent the squeegee element from excessive longitudinal displacement in either direction in the backing strip 40.

The backing strip 40 is a substantially elongate channel member having a web 41 with legs 42 substantially normal thereto. The backing strip 40 is also provided with co-planar elongate side rails, a first pair 43, 43a and a second pair 44 and 44a. The distance between the longitudinal edges of the first pair of side rails 43 and 43a in this embodiment being less than the distance between the longitudinal edges of the second pair of side rails 44 and 44a. In this way the backing strip 40 can be slideably receiveable between opposed claws of a harness which are spaced differently apart to those opposed claws of a different wiper blade harness. The legs 42 of the backing strip are preferably provided with inwardly projecting opposed longitudinal flanges 45 which together with the legs 42 and web 41 form an elongated slot 45a which extends the length of the backing strip 40. The anchoring bead 33 and guide bead 34 of the squeegee element 30 are receiveable within the slot 45a and is securable therein.

In FIG. 10, clip 50 is of a substantially U-shaped configuration as it has a body portion comprising a web 51 and a pair of flexible legs 52 connected thereto. The legs 52 are provided with tabs 53 having shoulders 58 which tabs 53 are adapted to lock behind the straddling claws 24 of the harness 20, when the clip is in engagement with the harness. The web 51 is provided with a pair of opposed side walls 54 having inwardly extending flanges 55 which are adapted to overlie the side rails 44 and 44a of the backing strip 40 when located under the clip and to further assist the anchoring means in holding the squeegee element in frictional or clamping engagement with the backing strip. Between web 51, legs 52, tabs 53 and walls 54 an opening is defined for receiving claws 24 of the harness, so that the claws abut against the front edge of the web, legs 52, tabs 53 and walls 54, to thereby limit the longitudinal movement of the backing strip relative to the harness. The shoulders 58 on tabs 53 also assist in retaining the claws of the harness within the opening adapted to receive the claws.

As shown in FIG. 4, pin 56 is adapted to engage an aperture 47 in the backing strip 40 and when brought into contact with a refill unit compresses the guide bead 34 of the squeegee element 30 into frictional engagement with the backing strip, so as to prevent excessive longitudinal displacement of the squeegee element 30 in the backing strip 40.

The legs 52 of the clip are spaced apart from the web 51 by means of reinforcing members 57 so as to provide flexibility for the free ends of the legs to enable the tabs 53 to pass over and then lock behind to retain the straddling claws 24 of the harness 20. The end wall 59 which may form part of the reinforcing members 57 assists in pin 56 in restraining the squeegee element 30 from longitudinal movement relative to the backing strip 40.

FIGS. 11 to 13 illustrate another embodiment of the retaining means wherein the clip 60 is of a substantially L-shaped configuration having body portion comprising a web 61, a pair of opposed side walls 62 and 62a respective, end wall 63 and a leg 64 resiliently connected thereto. One of the side walls 62 has a flap 65 hingedly connected thereto which is adapted to co-operate with the other side wall 62a so that the clip substantially completely overlies an end portion of the backing strip 40 when located therein. Flap 65 has a pin 66 positioned thereon, which is adapted to engage aperture 46 of the backing strip and when the pin 66 is brought into contact with a refill unit it compresses the guide bead 34 of the squeegee element into frictional or clamping engagement with the backing strip. The flap 65 is provided with a connecting means 67 which is adapted to co-operate with a complimentary connecting means 67a of side wall 62a, to give the body portion of the clip an open-ended box configuration.

Leg 64 is provided with a tab 68 which is adapted to lock behind the straddling claw of the harness, when the clip is in engagement with the harness. The tab 68 is suitably shaped such that it may lie between side rails 43 and 44 or 43a and 44a and contact leg 42 of the backing strip. The tab 68 of leg 64 therefore restricts the rotation of the clip about pin 66 when in assembled relationship with the backing strip, as a result of tab 68 abutting against leg 42.

Web 61 of the clip has an outwardly extending flexible resilient tongue or tab 69 for engaging the harness so as to limit vertical displacement of the clip relative to the harness, while also maintaining the clip in contact with the backing strip when in assembled relationship therewith. The tongue 69 is hingedly connected to the web. Tongue 69 has opposed outwardly extending fingers 70 and an upwardly extending lug 71 which assists in limiting the vertical displacement of the clip relative to the harness and for maintaining the clip in contact with the backing strip.

Web 61, leg 64 and tongue 69 (when present), together with the backing strip define an opening for receiving the claws of the harness. In this form, as the tongue 69 is hinged relative to the web, it is possible to adjust the size of the receiving opening to accommodate different size claws of different size harnesses. For example, in the clip 60 as shown in FIG. 11, tongue 69 is co-planar with web 61. In this form, when the clip is suitably positioned upon the backing strip, the straddling claw receiving opening is defined by the gap between the backing strip and leg 64, tab 68, tongue 69, and finger 70, which gap is adapted to receive the smaller sized claw. When tongue 69 is hinged back as illustrated by arrow A of FIG. 11, then the straddling claw receiving opening is defined by the gap between the backing strip and web 61, leg 64 and tab 68 which gap is adapted to receive a larger sized claw of the harness. As a result, therefore, by merely swinging tongue 69 into contact with the web of the backing strip or back on to web 61 of the clip, it is possible to adjust the size of the straddling claw receiving opening.

It is therefore possible with the retaining means and replaceable refill unit of the present invention to provide a refill unit adapted to be received on a plurality or currently available flexible pressured distributing harnesses such that the Vehicle Parts-Stockist need only stock the present replaceable refill units. As a consequence thereof, there are savings in stock and storage expenses.

Further as the squeegee element and backing strip of the replaceable refill unit lend themselves to be manufactured in a continuous strip form, the stockist need only carry a suitable length of the replaceable refill unit in its assembled form. In this way, the stockist by a simple cut of the refill unit can cut the unit to the customers requirement or the refill unit can be soled to the customer with instructions as to where the cut should be made to fit their individual requirements. Additionally, it has been found that with the retaining means of the present invention, it is only necessary for one retaining means to be used on each windscreen wiper blade assembly, whereas hitherto before retaining means were required at both ends of the assembly which again contributed to the higher costs of previous replaceable refill units.

I claim:

1. A releasable retaining means for restraining a squeegee element against longitudinal movement relative to a flexible resilient squeegee element backing strip and for limiting longitudinal movement of the backing strip relative to a harness of a windscreen wiper blade assembly, the retaining means comprising a clip having a body portion and at least one leg resiliently connected thereto having an inwardly directed tab portion, wherein the tab portion of the or each leg and the body portion together with the backing strip form a receiving means for engaging a claw of the harness, whereby to limit longitudinal movement of the backing strip relative to the harness, and, wherein the body portion includes an anchoring means adapted to penetrate into the backing strip and compress a portion of the squeegee element into frictional engagement with the backing strip, whereby to restrain the squeegee element against longitudinal movement relative to the backing strip.

2. The retaining means of claim 1, characterized in that the body portion comprises a web having a pair of opposed side walls integral therewith, wherein the side walls are adapted to assist the anchoring means in holding the squeegee element in frictional engagement with the backing strip.

3. The retaining means of claim 2, characterized in that the body portion is substantially channel shaped wherein the anchoring means is located on the web, and each side wall has an inwardly extending flange thereon, which flange is adapted to partially or completely overlie the backing strip when located thereunder, and, further assist the anchoring means in holding the squeegee element in frictional engagement with the backing strip.

4. A releasable retaining means for restraining a squeegee element against longitudinal movement relative to a flexible resilient squeegee element backing strip and for limited longitudinal movement of the backing strip relative to a harness of a windscreen wiper blade assembly, the retaining means comprising a clip having a substantially channel shaped body portion comprising a web having a pair of opposed side walls integral therewith and at least one leg resiliently connected to the body portion, wherein the or each leg and the body portion together with the backing strip form a receiving means for engaging a claw of the harness, whereby to limit longitudinal movement of the backing strip relative to the harness, and wherein the body portion includes an anchoring means adapted to penetrate into the backing strip and compress a portion of the squeegee element into frictional engagement with the backing strip, whereby to restrain the squeegee element against longitudinal movement relative to the backing strip, and wherein the side walls of the body portion are adapted to assist the anchoring means in holding the squeegee element in frictional engagement with the backing strip and wherein one of the side walls has a flap member hingedly connected thereto, and, is adapted to cooperate with the other side wall, whereby the body portion substantially completely overlies a portion of the backing strip when located therein, which flap member has the anchoring means located thereon to assist the anchoring means in holding the squeegee element in frictional engagement with the backing strip.

5. The retaining means of claim 4 characterized in that the web of the body portion has an outwardly extending flexible resilient tab for engaging the harness to limit vertical displacement of the retaining means relative to the harness, and maintain the retaining means in contact with the backing strip when in assembled relationship therewith.

6. The retaining means of claim 5, characterized in that the tab is hingedly connected to the web and together with the backing strip and leg or legs of clip from the receiving means whereby the tab is adapted to hinge relative to the web to alter the size of the receiving means to accommodate a different sized claw of a different sized harness.

7. The retaining means of claim 6, characterized in that the body portion further includes an end wall integral with the web and/or the other side walls, which end wall assists in restraining the squeegee element from longitudinal movement relative to the backing strip and limiting longitudinal movement of the backing strip relative to the harness.

8. The retaining means of claim 7, characterized in that the end wall extends continuously between the other side walls to give structural support to the other side walls and limits lateral movement of the backing strip relative to the retaining means.

9. The retaining means of claim 8, characterized in that the retaining means is a substabtially L or U-shaped clip wherein the or each leg of the clip is attached to resiliently engage the backing strip and a claw of the harness and wherein the anchoring means is a pin.

10. A replaceable refill unit for use in a windscreen wiper blade assembly for motor vehicles including a flexible pressure distributing harness having a plurality of pairs of laterally spaced apart opposed blade straddling claws, the refill unit comprising a flexible resilient squeegee element of elastomeric material having a guide bead integral an anchoring bead along one edge thereof, and, a wiping lip along the opposite edge thereof, and a flexible resilient backing strip for supporting the squeegee element, which backing strip comprises an elongate channel member having a pair of flexible resilient legs having free ends, said legs being connected together by a web, the free ends of the legs of the channel member each terminate in inwardly projecting opposed longitudinal flanges for retaining the guide bead and anchoring bead of the squeegee element, a first pair and a second pair of co-planar elongate side rails disposed for slidable engagement in the pairs of opposed blade straddling claws, each side rail of the first pair of side rails extending longitudinally along and laterally outwardly of the web, and, each side rail of the second pair of side rails extending longitudinally along and laterally outwardly of the free end of the legs of the channel member, the distance between the outer longitudinal edges of the first pair of side rails being different from the distance between the outer longitudinal edges of the second pair of side rails, whereby the backing strip is adapted to accommodate different wiper blade harnesses having opposed pairs of straddling claws spaced apart different distances, and wherein the guide bead and anchoring bead of the squeegee element is receivable in the channel member and retained in assembled relationship with the backing strip by a retaining means for limiting longitudinal movement of the backing strip relative to the harness of a windscreen wiper blade assembly, the retaining means comprising a clip having a body portion and at least one leg resiliently connected thereto having an inwardly directed tab portion, wherein the tab portion of the or each leg and the body portion together with the backing strip form a receiving means for engaging a claw of the harness, whereby to limit longitudinal movement of the backing strip relative to the harness, and, wherein the body portion includes an anchoring means adapted to penetrate into the backing strip and compress a portion of the squeegee element into frictional engagement with the backing strip, whereby to restrain the squeegee element against longitudinal movement relative to the backing strip.

11. The refill unit of claim 10 characterized in that the anchoring means is adapted to penetrate into the backing strip compresses the guide bead of the squeegee element into frictional engagement with the backing strip thereby restraining the squeegee element against longitudinal movement relative to the backing strip.

* * * * *